(12) United States Patent
Peterson et al.

(10) Patent No.: US 11,794,140 B1
(45) Date of Patent: Oct. 24, 2023

(54) AUXILIARY FILTER FOR ENHANCED CHEMICAL PROTECTION

(71) Applicant: Combat Capabilities Development Command, Chemical Biological Center, APG, MD (US)

(72) Inventors: Gregory Peterson, Bel Air, MD (US); Ryan Ballantyne, Columbus, OH (US); Michael Boruch, Fredericksburg, VA (US); William Clark, Fredericksburg, VA (US); Bruce Corso, Fredericksburg, VA (US); William B Feaver, Columbus, OH (US); Nicole Puckace, Darlington, MD (US); Jeffery Stephen Hoene, Churchville, MD (US); Joseph Hunt, King George, VA (US); Neil Kennihan, Dahlgre, VA (US); Craig LaMoy, King George, VA (US); Robert Kinter, Waldorf, MD (US); Michael J Knapke, Plain City, OH (US); Mark Noltimier, Columbus, OH (US); Michael Pompeii, Fredericksburg, VA (US); Chris Ritchey, Bel Air, MD (US); Joseph A Rossin, Columbus, OH (US); Rachel L Rossin, Ashville, OH (US); Richard Warder, Jr, King George, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 135 days.

(21) Appl. No.: 16/877,033

(22) Filed: May 18, 2020

(51) Int. Cl.
| | | |
|---|---|---|
| *B01D 46/00* | (2022.01) | |
| *B01D 29/52* | (2006.01) | |
| *B01D 37/02* | (2006.01) | |
| *B01D 46/56* | (2022.01) | |
| *C08L 67/06* | (2006.01) | |

(52) U.S. Cl.
CPC ......... *B01D 46/0036* (2013.01); *B01D 29/52* (2013.01); *B01D 37/025* (2013.01); *B01D 46/56* (2022.01); *B01D 2251/502* (2013.01); *B01D 2251/504* (2013.01); *B01D 2251/506* (2013.01); *B01D 2251/602* (2013.01); *B01D 2251/604* (2013.01); *B01D 2252/20431* (2013.01); *C08L 67/06* (2013.01)

(58) Field of Classification Search
None
See application file for complete search history.

(56) References Cited

U.S. PATENT DOCUMENTS

| | | | | |
|---|---|---|---|---|
| 5,665,143 | A * | 9/1997 | Jarvis et al. ............. | F24F 8/10 95/96 |
| 5,948,142 | A * | 9/1999 | Holmes et al. .... | B01D 53/0462 95/143 |
| 6,344,071 | B1* | 2/2002 | Smith et al. ........ | B01J 20/3092 95/274 |

(Continued)

*Primary Examiner* — Christopher P Jones
*Assistant Examiner* — Phillip Y Shao
(74) *Attorney, Agent, or Firm* — Ulysses John Biffoni

(57) ABSTRACT

A process and device for enhancing the chemical protection capability of a collective protection filter whereby the process stream exiting the collective protection filter is passed through an Auxiliary Filter. The auxiliary filter containing an ammonia removal media, such as zirconium hydroxide impregnated with zinc chloride ($ZnCl_2/Zr(OH)_4$), an oxidizing media, preferably zirconium hydroxide impregnated with potassium permanganate ($KMnO_4/Zr(OH)_4$), and a methyl bromide removal media, preferably activated carbon impregnated with triethylenediamine (TEDA/carbon). The auxiliary filter and process are configured to remove toxic industrial chemicals including $NH_3$, $NO_x$ (mixtures of NO and $NO_2$) and $CH_2O$, and $CH_3Br$.

25 Claims, 1 Drawing Sheet

(56) References Cited

U.S. PATENT DOCUMENTS

| | | | |
|---|---|---|---|
| 8,795,588 B2* | 8/2014 | Dardas et al. | B01D 53/885 |
| | | | 422/4 |
| 9,034,289 B1* | 5/2015 | Peterson et al. | B01D 51/10 |
| | | | 423/239.1 |
| 9,308,517 B1* | 4/2016 | Peterson et al. | B01J 20/3035 |
| 9,958,397 B1* | 5/2018 | Peterson et al. | G01N 31/22 |
| 2004/0255785 A1* | 12/2004 | Koslow | B01D 53/02 |
| | | | 96/154 |
| 2006/0254427 A1* | 11/2006 | Trend et al. | D04H 1/4291 |
| | | | 96/154 |
| 2009/0215618 A1* | 8/2009 | Fansler et al. | B01J 20/3204 |
| | | | 502/402 |
| 2010/0047142 A1* | 2/2010 | Wood et al. | B01J 20/3204 |
| | | | 502/200 |
| 2010/0291213 A1* | 11/2010 | Berrigan et al. | D04H 1/413 |
| | | | 96/108 |
| 2011/0308524 A1* | 12/2011 | Brey et al. | B01D 46/521 |
| | | | 128/205.12 |
| 2015/0283493 A1* | 10/2015 | Billingsley et al. | B01D 39/2072 |
| | | | 128/205.29 |
| 2017/0312685 A1* | 11/2017 | Knapke et al. | B01D 53/565 |

\* cited by examiner

AUXILIARY FILTER FOR ENHANCED CHEMICAL PROTECTION

GOVERNMENT INTEREST

The invention described herein may be manufactured, used and licensed by or for the U.S. Government.

FIELD OF THE INVENTION

The invention disclosed herein relates to a process for enhancing the chemical protection capability of a military collective protection filter. The invention involves locating an Auxiliary Filter downstream of a collective protection filter in order to expand chemical filtration capabilities versus ammonia ($NH_3$), oxides of nitrogen that include nitrogen dioxide ($NO_2$) and nitrogen monoxide (NO), formaldehyde ($CH_2O$) and methyl bromide ($CH_3Br$). The Auxiliary Filter is comprised of three distinct filtration materials - namely an ammonia removal media, an oxidizing media and a methyl bromide removal media.

BACKGROUND OF THE INVENTION

Collective protection (CP) filters are employed in military and civilian facilities to provide protection against chemical warfare agents and toxic threat compounds. Such facilities include, for example, buildings, shelters, ships, and vehicles. CP filters typically contain activated, impregnated carbon to remove traditional threat compounds, examples of which include chemical warfare agents such as nerve agents, blistering agents, blood gases, and choking agents. Examples of activated, impregnated carbon include ASZM-T and ASC whetlerite. ASZM-T comprises activated carbon loaded with oxides and carbonates of copper, zinc, molybdenum, silver and triethylenediamine (TEDA). ASC whetlerite comprises activated carbon impregnated with copper, chromium and silver. Although highly effective, CP filters have a limited capacity for certain toxic industrial chemicals (TICs). TICs are defined as toxic chemicals manufactured for industrial use. Examples of TICs not effectively removed by current CP filters include ammonia ($NH_3$), nitrogen dioxide ($NO_2$), formaldehyde ($CH_2O$) and methyl bromide ($CH_3Br$).

One method for adding filtration capability versus such TIC compounds is to add additional filtration capability to existing CP filters. This is best accomplished by increasing the size of the filter element to accommodate additional filtration media; however, this requires modifications to the existing infrastructure. Such modifications would result in excessive costs.

Thus, there exists a need for a low-cost enhancement to existing collective protection filters to enable such existing filters to be capable of removing toxic industrial chemicals including ammonia ($NH_3$), nitrogen ($NO_2$), formaldehyde ($CH_2O$) and methyl bromide ($CH_3Br$).

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

An Auxiliary Filter to an existing collective protection (CP) filter containing activated, impregnated carbon is provided. Existing CP filters are effective at removing traditional military threat compounds that include nerve agents, blistering agents, blood gases and choking agents. Existing CP filters are lacking in capability to remove toxic industrial (TICs) chemicals that include ammonia ($NH_3$), nitrogen ($NO_2$), formaldehyde ($CH_2O$) and methyl bromide ($CH_3Br$). Embodiments of the Auxiliary Filter enhance the capabilities of existing CP filters to remove such TICs. According to embodiments, the Auxiliary Filter is located downstream of the current CP filter. The Auxiliary Filter is located in existing ductwork of a CP filter or is provided as a stand-alone unit.

The downstream Auxiliary Filter contains media capable of removing the target TICs. In the present invention, the Auxiliary Filter includes an ammonia removal media, preferably zirconium hydroxide impregnated with zinc chloride ($ZnCl_2/Zr(OH)_4$), an oxidizing media, preferably zirconium hydroxide impregnated with potassium permanganate ($KMnO_4/Zr(OH)_4$) and a methyl bromide removal media, preferably activated carbon impregnated with triethylene diamine (TEDA/carbon). The purpose of the ammonia removal media is to remove $NH_3$. The purpose of the oxidizing media is to remove $NO_x$ (mixtures of NO and $NO_2$) and $CH_2O$. The purpose of methyl bromide removal media is to remove $CH_3Br$. It is desired that said media be employed that display a high capacity for the removal of the intended toxic compounds.

The media can be located in any order within the filter element; however, the most effective configuration of the media is to have the ammonia removal media at the filter inlet, the oxidizing media at the middle of the filter and the methyl bromide removal media at the filter outlet. It is desired that the Auxiliary Filter be configured in a manner that yields a low pressure drop. Examples of configurations include a packed bed, a radial flow filter or a panel filter configuration. The panel filter configuration is most preferred because it yields a high geometric surface area and corresponding low pressure drop.

BRIEF DESCRIPTION OF THE DRAWINGS

The present invention is further detailed with respect to the following drawings that are intended to show certain aspects of the present invention but should not be construed as a limit on the practice of the present invention.

DETAILED DESCRIPTION OF EMBODIMENTS OF THE INVENTION

Figure 1:
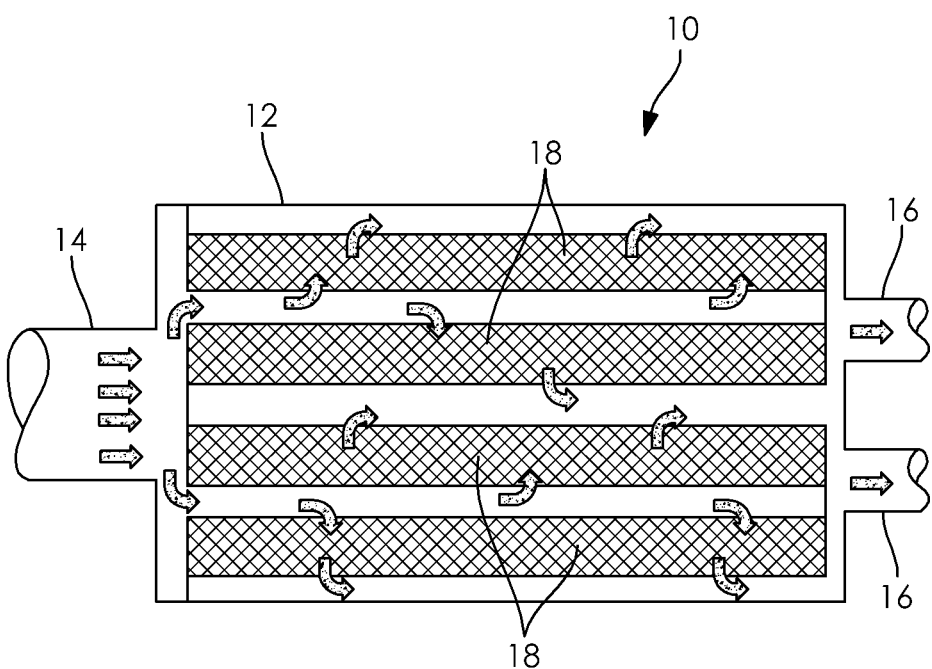
FIG. 1 is a cross sectional view of an Auxiliary Filter according to embodiments of the present invention.

The present invention has utility as a novel filtering device and process for removing $NH_3$, $NO_x$, $CH_2O$ and optionally $CH_3Br$ downstream of a military collective protection (CP) filter employed in chemical defense applications.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

The following description of embodiments of the invention is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

According to embodiments, the process involves locating an Auxiliary Filter downstream of an existing collective protection (CP) filter. According to embodiments, the Auxiliary Filter includes a layered bed of media including any of an ammonia removal media, an oxidizing material, a methyl bromide removal material, or a combination thereof. For optimal performance, it is desired that the filtration media of the layered bed be configured in a manner such that the ammonia removal material is at the inlet of the bed, followed by the oxidizing material, with the methyl bromide removal material being located at the outlet of the filter.

The ammonia removal material is defined as any filtration media that targets the removal of $NH_3$ as its primary function. Solid adsorbents employed in the removal of $NH_3$ include acids or metal salts located within the pores of a high-porosity substrate. Examples of high porosity substrates include activated carbon, aluminum oxide, aluminum hydroxide (such as pseudo-boehmite), silicon dioxide, titanium dioxide, zirconium dioxide and zirconium hydroxide. Zirconium hydroxide is the preferred substrate. Examples of acids include sulfuric acid, hydrochloric acid and nitric acid. Sulfuric acid is the preferred acid impregnant. Examples of metal salts include sulfates, chlorides and nitrates of transition metals such as iron, cobalt, nickel, copper or zinc. Zinc chloride is the preferred metal salt. Zirconium hydroxide impregnated with zinc chloride is the preferred ammonia removal material.

$NH_3$ is removed by reactions with acids, such as $H_2SO_4$, or by reactions with metals salts, such as zinc chloride, to yield the corresponding salt. For example:

$$2NH_3 + H_2SO_4 \rightarrow (NH_4)_2SO_4$$

$$2NH_3 + ZnCl_2 + H_2O \rightarrow 2NH_4Cl + ZnO$$

The oxidizing material is defined as any filtration material that targets the removal of nitrogen monoxide (NO), nitrogen dioxide ($NO_2$) and $CH_2O$ through oxidation chemistry. Solid adsorbents include oxidizers impregnated within the pores of porous substrates. Examples of high porosity substrates include activated carbon, aluminum oxide, aluminum hydroxide (such as pseudo-boehmite), silicon dioxide, titanium dioxide, zirconium dioxide and zirconium hydroxide. Zirconium hydroxide is the preferred substrate. Examples of oxidizers include MnO, $KMnO_4$ and monopersulfate (KHSO5 - 0.5KHSO$_4$ - 0.5$K_2SO_4$ - sold commercially as Oxone). $KMnO_4$ is the preferred oxidizer. Zirconium hydroxide impregnated with $KMnO_4$ is the preferred oxidizing material.

$KMnO_4$, for example, removes NO and $NO_2$ by oxidizing said compounds to nitrates, which interact with the high porosity substrate to yield the corresponding nitrate. Removal of NO is important given that contact of activated, impregnated carbon with $NO_2$ results in the $NO_2$ oxidizing the surface of carbon, liberating NO which readily passes through the bed of activated, impregnated carbon. $KMnO_4$ reacts with $CH_2O$ to yield formic acid, which is strongly retained on the high porosity substrate.

The methyl bromide removal material is defined as any filtration material that targets the removal of $CH_3Br$ by chemical reaction. Solid adsorbents include activated carbon impregnated with triethylenediamine (TEDA). Said material removes $CH_3Br$ by chemical reaction leading to the formation of the monosubstituted quaternary salt.

According to embodiments, the preferred ammonia removal material, zinc chloride impregnated zirconium hydroxide ($ZnCl_2/Zr(OH)_4$), is prepared by impregnation techniques known to one skilled in the art. According to embodiments, an aqueous $ZnCl_2$ solution of the appropriate concentration is prepared and is impregnated into the pores of $Zr(OH)_4$ powder to incipient wetness. In order to maximize the effectiveness of this material, it is desired that the concentration of $ZnCl_2$ in the impregnation solution is sufficient to achieve a $ZnCl_2$ loading of at least 25% and preferably at least 35%. Upon completion of the impregnation, the resulting powder is dried at a temperature and time sufficient to remove the moisture from the powder. The powder is then formed into granules using techniques known to one skilled in the art. For example, the powder is tableted, with the resulting tablets crushed and sieved to the appropriate mesh size, such as 16×30 mesh or similar.

According to embodiments, the preferred oxidizing material, potassium permanganate impregnated zirconium hydroxide ($KMnO_4/Zr(OH)_4$), is prepared by impregnation techniques known to one skilled in the art. According to embodiments, an aqueous $KMnO_4$ solution of the appropriate concentration is prepared and is impregnated into the pores of $Zr(OH)_4$ powder to incipient wetness. In order to maximize the effectiveness of this material, it is desired that the concentration of $KMnO_4$ in the impregnation solution is sufficient to achieve a $KMnO_4$ loading of at least 5% and preferably at least 10%. Upon completion of the impregnation, the resulting powder is dried at a temperature and time sufficient to remove the moisture from the powder. The powder is then formed into granules using techniques known to one skilled in the art. For example, the powder is tableted, with the resulting tablets crushed and sieved to the appropriate mesh size, such as 16×30 mesh or similar.

According to embodiments, the preferred methyl bromide removal material, TEDA impregnated carbon (TEDA/carbon), is prepared by sublimation techniques known to one skilled in the art. A target mass of carbon granules of the appropriate mesh size, such as 12 × 30 mesh, are added to a cone blender or similar device. An appropriate amount of TEDA is then added. The amount of TEDA added should be sufficient to achieve a loading of at least 6% and preferably at least 10%. The cone blender is then sealed and allowed to blend for a sufficient time to sublime the TEDA into the pores of the carbon granules. It is preferred that the blender is warmed to on the order of 40 to 70° C. in order to speed up the sublimation process. Upon completion, the contents of the blender are emptied.

The filtration media are employed as particles in many geometric forms which include granules, beads or extrudates. Generally, the smaller the particle size, the greater the filtration performance; however, too small of particle will lead to an excessive pressure drop through the filter bed. Therefore, according to embodiments the particles are generally greater than about 50 mesh, with the particle size distribution between about 4 mesh and 50 mesh being preferred. Examples of particle size distributions within the stated range include 4 by 10 mesh, 12 by 30 mesh and 20 by 50 mesh.

According to embodiments, the Auxiliary Filter is located downstream of the CP filter. The filter bed associated with the Auxiliary Filter can be configured in many ways that bring about contact between the three different filtration media and the process stream that exits the CP filter. According to embodiments, the three filtration media associated with the novel device and process may be blended together to yield a mixture of media, or be segregated within the filter bed. It is preferred that the filtration media be segregated within the filter bed. It is more preferred that the filter bed associated with the novel device and process be configured such that the ammonia removal media is located at the inlet of the bed, the oxidizing media is located at the middle of the bed, and the methyl bromide removal media is located at the exit of the bed. The preferred configuration, as just described, takes advantage of synergistic effects between the three filtration media.

According to embodiments, the Auxiliary Filter 10 includes two parts, namely a filter housing 12 and filter elements 18. The housing has an inlet 14, through which contaminated air enters the housing 12, and at least one outlet 16, through which filtered air exits the housing 12. The filter element 18 associated with the Auxiliary Filter 10 includes the three filtration media. According to embodiments, the element is configured as a packed bed filled with particles of media of the appropriate geometric form, such as granules. However, the pressure drop associated with this configuration can be excessive for certain applications. A preferred filter element is configured in a radial flow design. A radial flow filter element includes an annular bed filled with filtration media configured as described previously, whereby the process stream enters the inside diameter of the filter element and exits at the outside diameter. Such a configuration yields a reduced pressure drop (relative to a packed bed) by increasing the geometric surface area of the filter element. This configuration is currently employed in existing CP filters, such as the M98 filter. A more preferred configuration utilizes filter panel elements, as shown in FIG. 1.

FIG. 1 shows a cross sectional view of an Auxiliary Filter having filter panel elements according to embodiments of the present invention. As shown by the arrows in FIG. 1, contaminated air enters the filter housing via an inlet. The contaminated air is distributed in the space between the panel filter elements. The contaminated air flow passes through the panel filter elements, where the contaminants are removed. The newly filtered air then flows parallel to the panel filter elements before exiting the housing via an outlet. The two significant advantages of the panel filter element configuration are (1) increased geometric surface area - which reduces the pressure drop and (2) improved utilization of available volume - thus reducing the space claim of the Auxiliary Filter.

In a preferred filter element design, the filtration media is immobilized in polymeric webbing formed of structural fibers and low-melt fibers. According to embodiments, the structural and low melt fibers are formed of polyester. The low melt fibers secure the media in place by applying low temperature (greater than about 70° C.) air. Filtration media immobilized in the polymeric webbing is referred to as media-loaded webbing. It is preferred that the media loaded webbing be prepared as thin sheets approximately 3 mm thick, although thinner or thicker sheets can be used. The appropriate volume of filtration media is obtained by stacking a number of thin sheets one on top of the other. Use of media-loaded webbing provides a simple, low cost method for layering three dissimilar filtration media within a single filter element, be it a packed bed configuration, radial flow configuration, or panel filter configuration.

The amount of each type of media employed in the novel device and process described herein is dependent upon the level of chemical protection desired. The amount of each media should be sufficient to achieve the target level of chemical protection. As a result, the residence time of the process stream through each media can range from as little as 0.01 seconds up to and in excess of 0.25 seconds. In a preferred configuration capable of exceeding 60 minutes protection versus $NH_3$, 100 minutes protection versus $NO_2$, and 100 minutes protection versus $CH_2O$, the filter element associated with the novel device and process includes sufficient media to achieve a residence time through the preferred ammonia removal material, $ZnCl_2/Zr(OH)_4$, of 0.03 to 0.05 s, a residence time through the preferred oxidizing material, $KMnO_4/Zr(OH)_4$ of 0.06 to 0.08 seconds, and a residence time through the bed of TEDA/carbon of 0.01 seconds. If optional $CH_3Br$ removal is desired, additional TEDA/carbon is required. For example, if the desired protection versus $CH_3Br$ is 30 minutes, the residence time through the TEDA/carbon should be between 0.07 and 0.10 seconds.

The present invention is further detailed with respect to the following non limiting examples. These examples are not intended to limit the scope of the invention but rather highlight properties of specific inventive embodiments and the superior performance thereof relative to comparative examples. The following examples in particular illustrate the benefits of the downstream auxiliary filter in enhancing protection versus $NH_3$, $NO_2$, $CH_2O$ and $CH_3Br$.

Example 1: Preparation of $ZnCl_2/Zr(OH)_4$

Zirconium hydroxide powder with a surface area of 400 $m^2/g$ is obtained from MEL Chemicals. 100 kg of powder is impregnated with a zinc chloride solution prepared by dissolving 35 kg of zinc chloride in 50 liters of DI water. Upon completion of the impregnation operation, the saturated powder is loaded onto plastic trays and dried in a forced convection oven at 90° C. overnight. The dried powder is prepared as 16×30 mesh granules by first briquetting the powder using a roll compactor, then grinding the briquettes on a hammer mill and sieving the material to 16×30 mesh. Overs from the sieving operation are re-ground. Under sized particles are combined with virgin powder and re-compacted. The resulting material is 35% $ZnCl_2$, defined as 35 parts by weight $ZnCl_2$ per 100 parts by weight $Zr(OH)_4$.

Example 2: Preparation of $KMnO_4/Zr(OH)_4$

Zirconium hydroxide powder with a surface area of 400 $m^2/g$ is obtained from MEL Chemicals. 100 kg of powder is impregnated with a $KMnO_4$ solution prepared by dissolving 10 kg of $KMnO_4$ in 70 liters of warm DI water. Upon completion of the impregnation operation, the saturated powder is loaded onto plastic trays and dried in a forced convection oven at 90° C. overnight. The dried powder is prepared as 16×30 mesh granules by first briquetting the powder using a roll compactor, then grinding the briquettes on a hammer mill and sieving the material to 16×30 mesh. Overs from the sieving operation are re-ground. Under sized particles are combined with virgin powder and re-compacted. The resulting material is 10% $KMnO_4$, defined as 10 parts by weight $KMnO_4$ per 100 parts by weight $Zr(OH)_4$.

Example 3: Preparation of TEDA/Carbon

12×30 mesh coconut shell carbon with a surface area 1,600 $m^2/g$ is obtained from Jacobi Carbon. 50 kg of the carbon granules is loaded into a V-blender along with 5 kg of TEDA. The V-blender is sealed and the contents are mixed for 6 hours at 60° C. Upon completion, the V-blender and contents are allowed to cool. Once cool, the contents are emptied and sieved to remove fines. The resulting material is 10% TEDA by weight, defined as 10 parts by weight TEDA per 100 parts by weight carbon.

Example 4: Comparative - ASZM-T

ASZM-T (representative activated, impregnated carbon) is evaluated for its ability to remove $NH_3$, $NO_2$, $CH_2O$ and $CH_3Br$ from streams of air. Testing is performed by challenging a bed of 12×30 mesh ASZM-T granules with individually $NH_3$, $NO_2$, $CH_2O$ or $CH_3Br$ in air at 25° C. The residence time of the flow through the bed of ASZM-T is 0.21 seconds. This residence time is consistent with that of a military CP filter.

$NH_3$ testing: A bed of ASZM-T is exposed to flowing 15% relative humidity (RH) air at a residence time of 0.21 seconds for 3 hours prior to initiating the test. This exposure is performed for the purpose of equilibrating the ASZM-T with the humid air. Following pre-humidification, the bed is challenged with 1,000 $mg/m^3$ $NH_3$ at a residence time of 0.21 seconds. $NH_3$ analyses are performed using a UV visible detector. The $NH_3$ breakthrough time, defined as the time at which the effluent concentration of $NH_3$ exceeded 35 $mg/m^3$, was 12.5 minutes. The ASZM-T breakthrough time of $NH_3$ is provided in Table 1 below.

$NO_2$ testing: A bed of ASZM-T is exposed to flowing 80% relative humidity (RH) air at a residence time of 0.21 seconds overnight prior to initiating the test. This exposure is performed for the purpose of equilibrating the ASZM-T with the humid air. Following pre-humidification, the bed is challenged with 375 $mg/m^3$ $NO_2$ at a residence time of 0.21 seconds. Breakthrough occurred as NO. This is because contact of activated, impregnated carbon with $NO_2$ results in $NO_2$ oxidizing the surface of carbon, liberating NO which readily passes through the bed of ASZM-T. NO and $NO_2$ analyses are performed using an NO-$NO_x$ analyzer employing chemiluminescence. The NO breakthrough time, defined as the time at which the effluent concentration of NO exceeded 30 $mg/m^3$, was 14.0 minutes. The ASZM-T breakthrough time for the $NO_2$ challenge is provided in Table 1 below. When challenging ASZM-T with $NO_2$, breakthrough occurs as NO.

$CH_2O$ testing: A bed of ASZM-T is exposed to flowing 15% relative humidity (RH) air at a residence time of 0.21 seconds for 3 hours prior to initiating the test. This exposure is performed for the purpose of equilibrating the ASZM-T with the humid air. Following pre-humidification, the bed is challenged with 1,000 $mg/m^3$ $CH_2O$ at a residence time of 0.21 seconds. $CH_2O$ analyses are performed using Drager tubes to determine low-level concentrations and a gas chromatographic equipped with a $CO_2$ converter and a thermal conductivity detector (TCD) to determine higher concentrations. The $CH_2O$ breakthrough time, defined as the time at which the effluent concentration of $CH_2O$ exceeded 1.2 $mg/m^3$, was 25 minutes. The ASZM-T breakthrough time of $CH_2O$ is provided in Table 1 below.

$CH_3Br$ testing: A bed of ASZM-T is exposed to flowing 80% relative humidity (RH) air at a residence time of 0.21 seconds overnight prior to initiating the test. This exposure is performed for the purpose of equilibrating the ASZM-T with the humid air. Following pre-humidification, the bed is challenged with 1,000 $mg/m^3$ $CH_3Br$ at a residence time of 0.21 seconds. $CH_3Br$ analyses are performed using a gas chromatograph equipped with a flame ionization detector (FID). The $CH_3Br$ breakthrough time, defined as the time at which the effluent concentration of $CH_3Br$ exceeded 80 $mg/m^3$, was less than 2 minutes. The ASZM-T breakthrough time of $CH_3Br$ is provided in Table 1 below. Results presented in Table 1 demonstrate that ASZM-T provides little chemical protection versus $NH_3$, $NO_2$, $CH_2O$ and $CH_3Br$.

TABLE 1

ASZM-T Breakthrough Time of $NH_3$, $NO_2$, $CH_2O$, and $CH_3Br$.

| Chemical | Breakthrough Time, ASZM-T |
| --- | --- |
| $NH_3$ | 12.5 min |
| $NO_2$ | 14.0 min |
| $CH_2O$ | 25.0 min |
| $CH_3Br$ | 4.0 min |

Example 5: Evaluation of Auxiliary Filter

An auxiliary filter is located downstream of the ASZM-T bed. The auxiliary filter includes $ZnCl_2/Zr(OH)_4$ as 16×30 mesh granules, $KMnO_4/Zr(OH)_4$ as 16×30 mesh granules, and TEDA/carbon as 12×30 mesh granules. The residence time through the bed of ASZM-T is 0.21 seconds. The total residence time through the auxiliary filter bed is 0.11 seconds, with the residence time through the bed of $ZnCl_2/Zr(OH)_4$ set at 0.03 seconds, the residence time through the bed of $KMnO_4/Zr(OH)_4$ set at 0.07 seconds and the residence time through the bed of TEDA/carbon set at 0.01 seconds. The configuration described above is evaluated for its ability to remove $NH_3$, $NO_2$, $CH_2O$ and $CH_3Br$ in air at 25° C. under conditions described in Example 4. Breakthrough times are presented in Table 2 below.

TABLE 2

ASZM-T + Auxiliary Filter Breakthrough Time of $NH_3$, $NO_2$, $CH_2O$, and $CH_3Br$ with a total residence time through the auxiliary filter bed of 0.11 seconds.

| Chemical | Breakthrough Time, ASZM-T (from Example 4) | Breakthrough Time, ASZM-T plus Auxiliary Filter |
|---|---|---|
| $NH_3$ | 12.5 min | 62.5 min |
| $NO_2$ | 14.0 min | 200.0 min |
| $CH_2O$ | 25.0 min | 93.0 min |
| $CH_3Br$ | 4.0 min | 8.0 min |

The results presented in Table 2 demonstrate that the auxiliary filter is able to significantly enhance protection versus $NH_3$, $NO_2$ and $CH_2O$; however, in the tests of Example 5, increased protection versus $CH_3Br$ is less significant than the protection against $NH_3$, $NO_2$ and $CH_2O$.

Example 6: Evaluation of Auxiliary Filter

An auxiliary filter is located downstream of the ASZM-T bed. The auxiliary filter includes $ZnCl_2/Zr(OH)_4$ as 16×30 mesh granules, $KMnO_4/Zr(OH)_4$ as 16×30 mesh granules, and TEDA/carbon as 12×30 mesh granules. The residence time through the bed of ASZM-T is 0.21 seconds. The total residence time through the auxiliary filter bed is 0.07 seconds, with the residence time through the bed of $ZnCl_2/Zr(OH)_4$ set at 0.03 seconds, the residence time through the bed of $KMnO_4/Zr(OH)_4$ set at 0.03 seconds and the residence time through the bed of TEDA/carbon set at 0.01 seconds. The configuration described above is evaluated for its ability to remove $NH_3$, $NO_2$, $CH_2O$ and $CH_3Br$ in air at 25° C. under conditions described in Example 4. Breakthrough times are presented in Table 3 below.

TABLE 3

ASZM-T + Auxiliary Filter Breakthrough Time of $NH_3$, $NO_2$, $CH_2O$, and $CH_3Br$ with a total residence time through the auxiliary filter bed of 0.07 seconds.

| Chemical | Breakthrough Time, ASZM-T (from Example 4) | Breakthrough Time, ASZM-T plus Auxiliary Filter |
|---|---|---|
| $NH_3$ | 12.5 min | 45.0 min |
| $NO_2$ | 14.0 min | 85.0 min |
| $CH_2O$ | 25.0 min | 43.0 min |
| $CH_3Br$ | 4.0 min | 8.0 min |

The results presented in Table 3 demonstrate that the auxiliary filter is able to significantly enhance protection versus $NH_3$, $NO_2$ and $CH_2O$; however, in the tests of Example 6, improved protection versus $CH_3Br$ is less significant than the protection against $NH_3$, $NO_2$ and $CH_2O$.

Example 7: Evaluation of Auxiliary Filter

An auxiliary filter is located downstream of the ASZM-T bed. The auxiliary filter is comprised of $ZnCl_2/Zr(OH)_4$ as 16×30 mesh granules, $KMnO_4/Zr(OH)_4$ as 16×30 mesh granules and TEDA/carbon as 12×30 mesh granules. The residence time through the bed of ASZM-T is 0.21 seconds. The total residence time through the auxiliary filter bed is 0.20 seconds, with the residence time through the bed of $ZnCl_2/Zr(OH)_4$ set at 0.03 seconds, the residence time through the bed of $KMnO_4/Zr(OH)_4$ set at 0.07 seconds and the residence time through the bed of TEDA/carbon set at 0.10 seconds. The configuration described above is evaluated for its ability to remove $NH_3$, $NO_2$, $CH_2O$ and $CH_3Br$ in air at 25° C. under conditions described in Example 4. Breakthrough times are presented in Table 4 below.

TABLE 4

ASZM-T + Auxiliary Filter Breakthrough Time of $NH_3$, $NO_2$, $CH_2O$, and $CH_3Br$ with a total residence time through the auxiliary filter bed of 0.20 seconds.

| Chemical | Breakthrough Time, ASZM-T (from Example 4) | Breakthrough Time, ASZM-T plus Auxiliary Filter |
|---|---|---|
| $NH_3$ | 12.5 min | 62.5 min |
| $NO_2$ | 14.0 min | 220.0 min |
| $CH_2O$ | 25.0 min | 105.0 min |
| $CH_3Br$ | 4.0 min | 36.0 min |

The results presented in Table 4 demonstrate that adding additional TEDA/carbon to the auxiliary filter enhances $CH_3Br$ removal.

Example 8: Evaluation of Auxiliary Filter

An auxiliary filter is located downstream of the ASZM-T bed. The auxiliary filter is comprised of $ZnCl_2/Zr(OH)_4$ as 16×30 mesh granules, $KMnO_4/Zr(OH)_4$ as 16×30 mesh granules and TEDA/carbon as 12×30 mesh granules. The residence time through the bed of ASZM-T is 0.21 seconds. The total residence time through the auxiliary filter bed is 0.30 seconds, with the residence time through the bed of $ZnCl_2/Zr(OH)_4$ set at 0.03 seconds, the residence time through the bed of $KMnO_4/Zr(OH)_4$ set at 0.07 seconds and the residence time through the bed of TEDA/carbon set at 0.20 seconds. The configuration described above is evaluated for its ability to remove $NH_3$, $NO_2$, $CH_2O$ and $CH_3Br$ in air at 25° C. under conditions described in Example 4. Breakthrough times are presented in Table 5 below.

TABLE 5

ASZM-T + Auxiliary Filter Breakthrough Time of $NH_3$, $NO_2$, $CH_2O$, and $CH_3Br$ with a total residence time through the auxiliary filter bed of 0.30 seconds.

| Chemical | Breakthrough Time, ASZM-T (from Example 4) | Breakthrough Time, ASZM-T plus Auxiliary Filter |
|---|---|---|
| $NH_3$ | 12.5 min | 62.5 min |
| $NO_2$ | 14.0 min | 248.0 min |
| $CH_2O$ | 25.0 min | 105.0 min |
| $CH_3Br$ | 4.0 min | 122.0 min |

The results presented in Table 5 demonstrate that adding additional TEDA/carbon to the auxiliary filter enhances $CH_3Br$ removal.

Example 9: Evaluation of Auxiliary Filter Using Media-Loaded Webbing

An auxiliary filter is located downstream of the ASZM-T bed. The auxiliary filter is comprised of $ZnCl_2/Zr(OH)_4$ as media-loaded webbing, $KMnO_4/Zr(OH)_4$ as media-loaded webbing and TEDA/carbon as media-loaded webbing. The residence time through the bed of ASZM-T is 0.21 seconds. The total residence time through the auxiliary filter bed is 0.14 seconds, with the residence time through the $ZnCl_2/Zr(OH)_4$ in the media-loaded webbing set at 0.04 seconds, the residence time through the $KMnO_4/Zr(OH)_4$ in the media-loaded webbing set at 0.07 seconds and the residence time through the TEDA/carbon in the media-loaded webbing set at 0.03 seconds. The configuration described above is evaluated for its ability to remove $NH_3$, $NO_2$ and $CH_2O$ in air at 25° C. under conditions described in Example 4. Breakthrough times are presented in Table 6 below.

TABLE 6

ASZM-T + Auxiliary Filter Breakthrough Time of $NH_3$, $NO_2$, and $CH_2O$ with a total residence time through the auxiliary filter bed of 0.14 seconds.

| Chemical | Breakthrough Time, ASZM-T (from Example 4) | Breakthrough Time, ASZM-T plus Auxiliary Filter |
|---|---|---|
| $NH_3$ | 12.5 min | 66.5 min |
| $NO_2$ | 14.0 min | 226.0 min |
| $CH_2O$ | 25.0 min | 217.0 min |

The results presented in Table 6 demonstrate that the auxiliary filter significantly enhances the removal of $NH_3$, $NO_2$ and $CH_2O$.

Example 10: Evaluation of Auxiliary Filter Using Media-Loaded Webbing

An auxiliary filter is located downstream of the ASZM-T bed. The auxiliary filter is comprised of $ZnCl_2/Zr(OH)_4$ as media-loaded webbing, $KMnO_4/Zr(OH)_4$ as media-loaded webbing and TEDA/carbon as media-loaded webbing. The residence time through the bed of ASZM-T is 0.21 seconds. The total residence time through the auxiliary filter bed is 0.08 seconds, with the residence time through the $ZnCl_2/Zr(OH)_4$ in the media-loaded webbing set at 0.03 seconds, the residence time through the $KMnO_4/Zr(OH)_4$ in the media-loaded webbing set at 0.03 seconds and the residence time through the TEDA/carbon in the media-loaded webbing set at 0.02 seconds. The configuration described above is evaluated for its ability to remove $NH_3$, $NO_2$ and $CH_2O$ in air at 25° C. under conditions described in Example 4. Breakthrough times are presented in Table 7 below.

TABLE 7

ASZM-T + Auxiliary Filter Breakthrough Time of $NH_3$, $NO_2$, and $CH_2O$ with a total residence time through the auxiliary filter bed of 0.08 seconds.

| Chemical | Breakthrough Time, ASZM-T (from Example 4) | Breakthrough Time, ASZM-T plus Auxiliary Filter |
|---|---|---|
| NH3 | 12.5 min | 48.5 min |
| $NO_2$ | 14.0 min | 108.0 min |
| $CH_2O$ | 25.0 min | 67.0 min |

The results presented in Table 7 demonstrate that the auxiliary filter significantly enhances the removal of $NH_3$, $NO_2$ and $CH_2O$.

Various modifications of the present invention, in addition to those shown and described herein, will be apparent to those skilled in the art of the above description. Such modifications are also intended to fall within the scope of the appended claims.

Patents and publications mentioned in the specification are indicative of the levels of those skilled in the art to which the invention pertains. These patents and publications are incorporated herein by reference to the same extent as if each individual application or publication was specifically and individually incorporated herein by reference for the entirety of their teaching.

The foregoing description is illustrative of particular embodiments of the invention but is not meant to be a limitation upon the practice thereof. The following claims, including all equivalents thereof, are intended to define the scope of the invention.

The invention claimed is:

1. A process for enhancing the chemical protection capability of a collective protection filter, comprising:
    passing a process stream exiting the collective protection filter through an auxiliary filter having filtration media comprising: an ammonia removal media; an oxidizing media; and a methyl bromide removal media,
    wherein the ammonia removal media, the oxidizing media, and the methyl bromide removal media are segregated within said filtration media; and
    wherein said ammonia removal media is located at an inlet side of the filtration media, said oxidizing media is located at a middle of the filtration media, and said methyl bromide removal media is located at an outlet side of the filtration media.

2. The process of claim 1, wherein the ammonia removal media is comprised of a porous substrate impregnated with at least one of $H_2SO_4$, HCl, $HNO_3$ or mixtures thereof, or the porous substrate is impregnated with at least one of a transition metal sulfate, transition metal chloride, a transition metal nitrate, or mixtures thereof.

3. The process of claim 2, wherein the porous substrate comprises at least one of activated carbon, aluminum oxide, aluminum hydroxide, pseudo-boehmite, silicon dioxide, titanium dioxide, zirconium dioxide, zirconium hydroxide, or mixtures thereof.

4. The process of claim 1, wherein the ammonia removal media comprises zirconium hydroxide impregnated with zinc chloride.

5. The process of claim 1, wherein the oxidizing media comprises a porous substrate impregnated with at least one of MnO, $KMnO_4$, monopersulfate, or mixtures thereof.

6. The process of claim 5, wherein the porous substrate comprises at least one of activated carbon, aluminum oxide, aluminum hydroxide, pseudo-boehmite, silicon dioxide, titanium dioxide, zirconium dioxide, zirconium hydroxide, or mixtures thereof.

7. The process of claim 1, wherein the oxidizing media comprises zirconium hydroxide impregnated with $KMnO_4$.

8. The process of claim 1, wherein the methyl bromide removal media comprises activated carbon impregnated with triethylenediamine.

9. The process of claim 1, wherein the residence time of the process stream within the auxiliary filter is between 0.03 seconds and 0.5 seconds.

10. The process of claim 1, wherein the auxiliary filter is configured from the group consisting of: as a packed bed filter; as a radial flow filter; or as a panel filter.

11. The process of claim 1, wherein the filtration media is immobilized in polymeric webbing.

12. The process of claim 11, wherein the polymeric webbing comprises polyester fibers.

13. An auxiliary filter for use with a collective protection filter, the auxiliary filter comprising:
    a housing having an inlet and an outlet; and
    a filtration media contained within the housing, the filtration media comprising an ammonia removal media, an oxidizing media, and a methyl bromide removal media;
    wherein the ammonia removal media, the oxidizing media, and the methyl bromide removal media are segregated within said filtration media; and
    wherein said ammonia removal media is located at an inlet side of the filtration media, said oxidizing media is located at a middle of the filtration media, and said methyl bromide removal media is located at an outlet side of the filtration media.

14. The auxiliary filter of claim 13, wherein the ammonia removal media is comprised of a porous substrate impregnated with at least one of $H_2SO_4$, HCl, $HNO_3$ or mixtures thereof, or the porous substrate is impregnated with at least one of a transition metal sulfate, transition metal chloride, a transition metal nitrate, or mixtures thereof.

15. The auxiliary filter of claim 14, wherein the porous substrate comprises at least one of activated carbon, aluminum oxide, aluminum hydroxide, pseudo-boehmite, silicon dioxide, titanium dioxide, zirconium dioxide, zirconium hydroxide, or mixtures thereof.

16. The auxiliary filter of claim 13, wherein the ammonia removal media comprises zirconium hydroxide impregnated with zinc chloride.

17. The auxiliary filter of claim 13, wherein the oxidizing media comprises a porous substrate impregnated with at least one of MnO, $KMnO_4$, monopersulfate, or mixtures thereof.

18. The auxiliary filter of claim 17, wherein the porous substrate comprises at least one of activated carbon, aluminum oxide, aluminum hydroxide, pseudo-boehmite, silicon dioxide, titanium dioxide, zirconium dioxide, zirconium hydroxide, or mixtures thereof.

19. The auxiliary filter of claim 13, wherein the oxidizing media comprises zirconium hydroxide impregnated with $KMnO_4$.

20. The auxiliary filter of claim 13, wherein the methyl bromide removal media comprises activated carbon impregnated with triethylenediamine.

21. The auxiliary filter of claim 13, wherein the auxiliary filter is configured from the group consisting of: as a packed bed filter; as a radial flow filter; or as a panel filter.

22. The auxiliary filter of claim 13, wherein the filtration media is immobilized in polymeric webbing.

23. The auxiliary filter of claim 22, wherein the polymeric webbing comprises polyester fibers.

24. The process of claims 1, wherein the ammonia removal media comprises zirconium hydroxide impregnated with zinc chloride, wherein the oxidizing media comprises zirconium hydroxide impregnated with $KMnO_4$, and wherein the methyl bromide removal media comprises activated carbon impregnated with triethylenediamine.

25. The auxiliary filter of claim 13, wherein the ammonia removal media comprises zirconium hydroxide impregnated with zinc chloride, wherein the oxidizing media comprises zirconium hydroxide impregnated with $KMnO_4$, and wherein the methyl bromide removal media comprises activated carbon impregnated with triethylenediamine.

* * * * *